US012116091B2

(12) United States Patent
Alvén

(10) Patent No.: US 12,116,091 B2
(45) Date of Patent: Oct. 15, 2024

(54) BOAT HULL WASHING APPARATUS

(71) Applicant: Rentunder AB, Östhammar (SE)

(72) Inventor: Jan Alvén, Spånga (SE)

(73) Assignee: Rentunder AB, Osthammar (SE)

( * ) Notice: Subject to any disclaimer, the term of this patent is extended or adjusted under 35 U.S.C. 154(b) by 418 days.

(21) Appl. No.: 17/536,773

(22) Filed: Nov. 29, 2021

(65) Prior Publication Data

US 2022/0169346 A1 Jun. 2, 2022

(51) Int. Cl.

| | |
|---|---|
| ***B63B 59/08*** | (2006.01) |
| ***B08B 1/12*** | (2024.01) |
| ***B63C 1/02*** | (2006.01) |
| ***B63C 1/10*** | (2006.01) |

(52) U.S. Cl.
CPC ................ *B63B 59/08* (2013.01); *B08B 1/12* (2024.01); *B63C 1/02* (2013.01); *B63C 1/10* (2013.01); *B63B 2059/082* (2013.01); *B63B 2059/087* (2013.01)

(58) Field of Classification Search
CPC .............. B63B 59/08; B63B 2059/082; B63B 2059/087; B08B 1/12; B08B 1/30; B08B 1/32; B63C 1/02; B63C 1/10
See application file for complete search history.

(56) References Cited

U.S. PATENT DOCUMENTS

| | | | | |
|---|---|---|---|---|
| 3,752,109 A * | 8/1973 | Seiple | B63B 59/08 114/222 |
| 4,043,286 A * | 8/1977 | Doty | B63B 59/08 15/53.4 |
| 2008/0282956 A1* | 11/2008 | Morace | B63B 59/08 114/222 |
| 2020/0102058 A1* | 4/2020 | Bardelli | B63C 1/02 |

* cited by examiner

*Primary Examiner* — Andrew Polay
(74) *Attorney, Agent, or Firm* — Schott, P.C.

(57) ABSTRACT

A boat hull washing apparatus includes a left structure and a right structure, one or more brushes arranged to wash a hull of a boat positioned between the structures. The apparatus is provided with a boat positioning assembly that includes a left and a right boat pushing device. The left and right boat pushing devices are attached to left/right structures respectively. The left boat pushing device is arranged to bias a boat, located between the left and right structures, away from the left structure, and the right device functions similar away from the right structure. In this way, the pushing devices are arranged to hold the boat in a lateral position. Using this arrangement of the left and right pushing devices to bias the boat away from the left and right structures, respectively, a single force generating unit is connected to both pushing devices.

6 Claims, 4 Drawing Sheets

BOAT HULL WASHING APPARATUS

TECHNICAL FIELD

The invention relates to a boat hull washing apparatus.

BACKGROUND

It is well known that on boats of all sizes, organisms may stick on the part of the boat hull that is in constant or intermittent contact with the water. The growth leads to the boat creating greater frictional resistance as it moves through the water, which leads to lower speed and/or higher fuel consumption.

Known measures to prevent or reduce such growth include antifouling, i.e. a hull coating. The coating is toxic, and may therefore create negative environmental impacts to marine life. There is therefore a desire to replace antifouling with more environmentally friendly measures.

To clean a boat from marine growth, apparatuses which wash the boat hull, while the boat is in the water, are known. Such apparatuses may include rotating brushes which are moved under the hull. A boat washing device marketed as Corydoras Hull Washer by Impianti Portuali e Servizi Morace s.rl.l, and shown in a video on the web address https://www.youtube.com/watch?v=OZ7PoS6iOUk, has two elongated elements, with respective connection beams, distributed on both sides of the boat to be washed. The object with the elements seems to be a control of the transverse position of the boat.

There is nevertheless a desire to provide a simple and cost effective way of controlling the position of boats in boat washing apparatuses.

SUMMARY

An object of the invention is to provide a simple and cost effective way of controlling the position of boats in boat washing apparatuses.

The object is achieved by a boat hull washing apparatus comprising a left structure and a right structure, the apparatus further comprising one or more brushes arranged to wash a hull of a boat positioned between the structures. The apparatus is provided with a boat positioning assembly comprising a left boat pushing device and a right boat pushing device, wherein the left boat pushing device is attached to the left structure, and the right boat pushing device is attached to the right structure. The left boat pushing device is arranged to bias a boat, located between the left and right structures, away from the left structure, and the right boat pushing device is arranged to bias the boat away from the right structure, whereby the pushing devices are arranged to hold the boat in a lateral position, wherein, for said arrangement of the left and right pushing devices to bias the boat away from the left and right structures, respectively, a single force generating unit is connected to both pushing devices.

Thus, the boat positioning assembly is adapted to hold the boat in a position between the left and right structures. Thereby, the pushing devices may be arranged to push the boat in opposite directions. Thereby, the lateral forces exerted by the pushing devices on the boat may be equal. The left and right structures may be fixed in relation to each other. The structures may be jetties. Thus, the left structure may be a left jetty, and the right structure may be a right jetty. Thereby, the structures may be adapted for persons walking on them. Alternatively, the structures may be provided merely to hold the pushing devices.

As exemplified below, each pushing device may comprise a pushing element. The pushing devices may be arranged to move the pushing element from a retracted position, into contact with the hull of the boat. The lateral position in which the boat may be held by the pushing devices may be referred to as a holding position. The holding position may be laterally halfway between the structures. Where the boat is located laterally at a distance from the holding position, the pushing element of one of the pushing devices may come into contact with the hull, before the pushing element of the other of the pushing devices comes into contact with the hull. Thereby, the pushing element that is in contact with the hull, may push the boat towards the holding position. It the holding position, the pushing elements of both pushing devices may be in contact with the hull. Thereby, the pushing elements may be in contact with the hull on opposite lateral sides of the hull. Thereby, the pushing elements may bias the boat in opposite directions to keep the boat in the holding position. Reaction forces from the forces with which the pushing element bias the boat may be received by the left and right structures.

The one or more brushes may be arranged between the structures. The one or more brushes may be attached to the structures. The one or more brushes may be arranged to move along a boat positioned between the structures, to wash the hull of the boat. The one or more brushes may be arranged to move along the structures while being attached to the structures. What is herein referred to as the lateral direction of the boat washing apparatus may be transverse to a direction of movement of the one or more brushes.

The brushes and the pushing devices may be symmetrically arranged in relation to a center line of the boat hull washing apparatus, which center line extends between the left and right structures. Thereby, the pushing devices may be arranged to be on opposite lateral sides of a boat located between the left and right structures. Thereby, the boat may be held in the holding position by the pushing devices.

The boat positioning assembly ensures a correct positioning of the boat in relation to the brushes. The lateral position in which the boat may be held by the pushing devices position may be the correct position in relation to the brushes. By being positioned correctly in relation to the brushes, a good washing result can be ensured. On the contrary, if a boat is moored in a boat washing apparatus by hand, e.g. by people entering the apparatus with the boat, there is a risk that the boat is incorrectly positioned in relation to the brushes of the boat washing apparatus. Thereby, the result of the boat washing process may be less good than desired. Thus, the invention decreases risks of a reduced quality of the result of a boat washing process in the boat washing apparatus, due to incorrect positioning, e.g. at manual mooring.

Preferably, the single force generating unit is connected to both pushing devices via a single movable connection element.

The pushing devices may both be connected to the single movable connection element via respective actuation connection devices, e.g. in the form of, or comprising elongated flexible pulling elements, such as ropes, wires of chains. Thus, the force generating unit may be connected to both pushing devices via the single movable connection element as well as via the actuation connection devices.

The force generating unit may be formed by a single actuation device, such as a single hydraulic cylinder. In some embodiments, the force generating unit comprises two or more actuation devices, e.g. in the form of hydraulic cylinders, which may be arranged in series or in parallel. In some embodiments, the force generating unit may comprise one or more electric actuators, or one or more pneumatic actuators.

By the single force generating unit being connected to both pushing devices, the force generating unit may be used to maneuver both pushing devices. Thereby, for the desired boat lateral position, there is, merely due to the connection of the single force generating unit to both pushing devices, a balance between external lateral forces, for example due to wind or currents, and the forces acting on the boat by the pushing devices. Thereby, the boat may be held in the desired lateral position without the use of actuator control devices including sensors and electronics.

In addition, where a boat, for example at arrival to the washing apparatus, is located laterally offset to the desired position, for example due to a strong lateral wind, all available power of the force generating unit may be directed to the pushing device that is located on the side towards which the boat is offset. Thereby all available power of the force generating unit may be used for moving the boat laterally. This may provide a quick lateral adjustment of the boat.

Since there is no need for separate actuation assemblies for the pushing devices, there is no need for any synchronization control of such separate actuation assemblies, using for example sensors and electronics. This simplifies the washing apparatus and reduces the cost for it.

Preferably, apart from one or more optional elastic elements, e.g. as exemplified below, no further actuation devices are arranged to act on the pushing elements. The single force generating unit is preferably arranged to actuate both pushing devices. The single force generating unit is preferably arranged to generate all loads on the pushing devices, apart from loads generated by the boat, one or more optional elastic elements, and environmental loads such as gravity, and wind.

The single force generating unit may be connected to both pushing devices via respective actuation connection devices. The actuation connection devices comprise elongated flexible pulling elements. The left and right structures may form parts of a structure assembly, wherein the single force generating unit is attached to the structure assembly.

Preferably, each pushing device comprises a pushing element arranged to contact a boat located between the left and right structures. Thereby, the pushing element may be arranged to bias the boat on opposite lateral sides of the boat, on opposite directions, with equal forces, so as to hold the boat in a lateral position in the apparatus.

The left structure and the right structure may be connected to each other via a transverse structure. Thereby, each pushing element may be arranged so that a movement of the pushing element towards the boat, is combined with a movement of the pushing element towards the transverse structure. A boat may be fastened, e.g. at its bow, to the transverse structure. Thereby, when correctly positioned in the apparatus, a longitudinal direction of the boat may be substantially parallel to the left and right structures. For boats which are relatively small, said combined movement of the pushing element allows the pushing elements to be, when biasing the boat, positioned closer to the transverse structure, compared to when biasing a relatively large boat. Thereby, an automatic adjustment of the boat positioning assembly to the size of the boat is accomplished.

Each pushing element may be a pushing bar. Thereby, each pushing bar may be connected to the respective of the left and right structures, via two or more connecting beams, wherein the connecting beams are connected to the pushing bar by means of respective articulated joints, wherein the beams are connected to the respective of the left and right structures by means of further respective articulated joints. Thereby, for each pushing device, the pushing bar, the connecting beams, and the respective of the left and right structures, may form a parallelogram with an adjustable angle between the pushing bar, and the connecting beams. Thereby, by rotating the connecting beams, the pushing bar is moved, while remaining parallel to the left and right structures, along a circular path, which is partly lateral in relation to the left and right structures. Thereby, the pushing bar may remain substantially parallel to the left and right structures. As exemplified below, the arrangement with a circular movement of the respective pushing bar, provides for the pushing device to occupy a relatively small space on, or in, the respective structure.

Where each pushing device comprises a pushing element, and each pushing element is connected to a respective of the left and right structures via one or more connecting beams, the single force generating unit may be arranged to rotate the connecting beams, so as for the pushing elements to contact a boat located between the left and right structures to bias the boat in opposite lateral directions.

In some embodiments, the single force generating unit may be arranged to rotate the connecting beams via respective actuation connection devices. The actuation connection devices may comprise elongated flexible pulling elements. The pulling elements may be e.g. ropes, wires, or chains. One or more of the actuation connection devices may comprise one or more rods, e.g. metal rods, e.g. aluminium or steel rods. Thereby, the stiffness of the actuation connection devices may be increased. One or more of the actuation connection devices may comprise one or more elongated flexible pulling elements as well as one or more rods. The pulling elements may be attached to ends of the rods. One or more blocks may be used for changing the direction of the pulling elements. One or more bellcranks may be used to connect the rods.

The single force generating unit may be arranged to pull the actuation connection devices. Thereby tensile forces are introduced to the actuation connection devices. In alternative embodiments, the single force generating unit is arranged to push the actuation connection devices. Thereby compressive forces are introduced to the actuation connection devices. Thereby, each of the actuation connection devices may comprise one or more rods, and optionally one or more bellcranks connecting the rods.

In some embodiments, the actuation connection devices connected to the single force generating unit, may be arranged to actuate the pushing elements directly, rather than via the connecting beams.

As suggested, in some the embodiments, a single actuation device is connected to both pushing devices. Thereby, the single actuation device may form the force generating unit. Thereby, the single movable connection element may be formed by a rope, a wire, a chain, a rod, a bracket, or any other suitable single device. In some embodiments, the single movable connection element may be a part of an actuator, such as a rod of a hydraulic cylinder. Thereby, the force generating unit may be formed by the remainder of the actuator.

Where the left and right structures form parts of a structure assembly, the single force generating unit may be attached to the structure assembly and connected to at least one of the connecting beams of the respective pushing device, via respective actuation connection devices, e.g. in the form of, or comprising elongated flexible pulling elements. Thereby, the single force generating unit, e.g. in the form of a single actuator, may be used to actuate both pushing devices. The pulling elements may extend from the single force generating unit to the pushing devices via blocks. As suggested, by the actuation of the pushing devices by means of the single force generating unit, via the actuation connection devices, a boat may be pushed by only one of the pushing devices, with the full power of the single force generating unit, and subsequently each pushing device may bias the boat with half the energy with which the single force generating unit pulls the pulling devices.

Preferably, an elastic element is arranged to bias the respective pushing device into a retracted position. As exemplified below, this facilitates the use of the actuation connection devices for the actuation of the single force generating unit.

Preferably the single force generating unit is arranged to actuate the pushing devices, via respective actuation connection devices, by tension forces in the actuation connection devices. Thereby, the single force generating unit may be arranged to cause movements of the pushing devices from their retracted positions, solely by tension forces in the actuation connection devices. Further, the single force generating unit may be arranged to cause the pushing devices to hold a boat in the holding position, solely by tension forces in the actuation connection devices. Thereby, compression forces in the actuation connection devices may be avoided. Thereby, the actuation connection devices may be designed without concern for the risk of buckling. When a boat washing process is completed, the single force generating unit may be controlled to remove the tension in the actuation connection devices. Thereby, an elastic element may be arranged to move the respective pushing device into a retracted position.

Further advantages and advantageous features of embodiments of the invention are disclosed in the following description.

BRIEF DESCRIPTION OF THE DRAWINGS

Below, embodiments of the invention will be described with reference to the drawings, in which.

DETAILED DESCRIPTION OF EMBODIMENTS OF THE INVENTION

Figure 1:
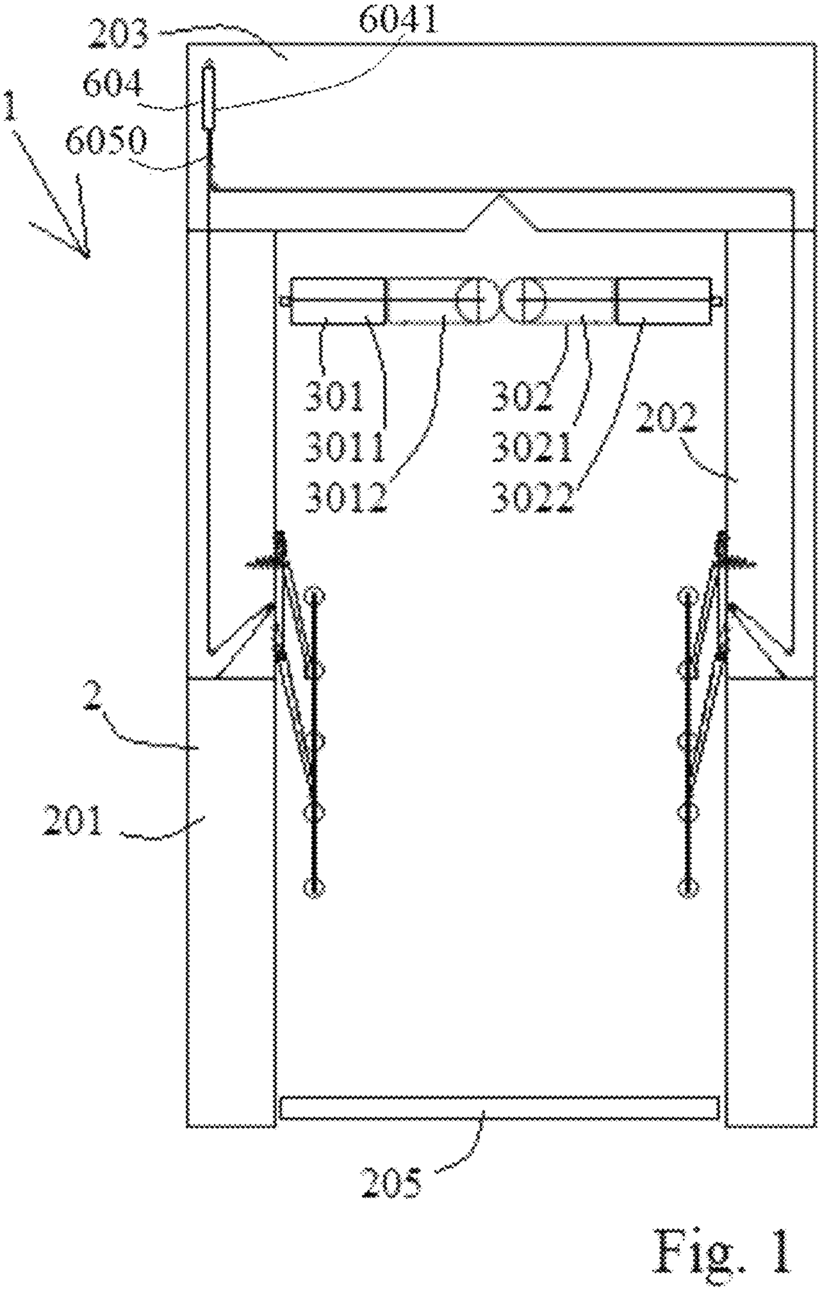
FIG. 1 shows a top view of a boat hull washing apparatus according to an embodiment of the invention.

FIG. 1 shows a top view of a boat hull washing apparatus 1. The apparatus comprises a 5 structure assembly forming a jetty assembly 2. The jetty assembly comprises left and right structures in the form of left and right jetties 201, 202. The left and right jetties are parallel and spaced apart. The left and right jetties are connected, at respective longitudinal ends thereof, by a transverse structure in the form of a transverse jetty 203. Thereby, the jetty assembly is generally U-shaped. The jetty assembly forms walkways for persons.

Figure 2:
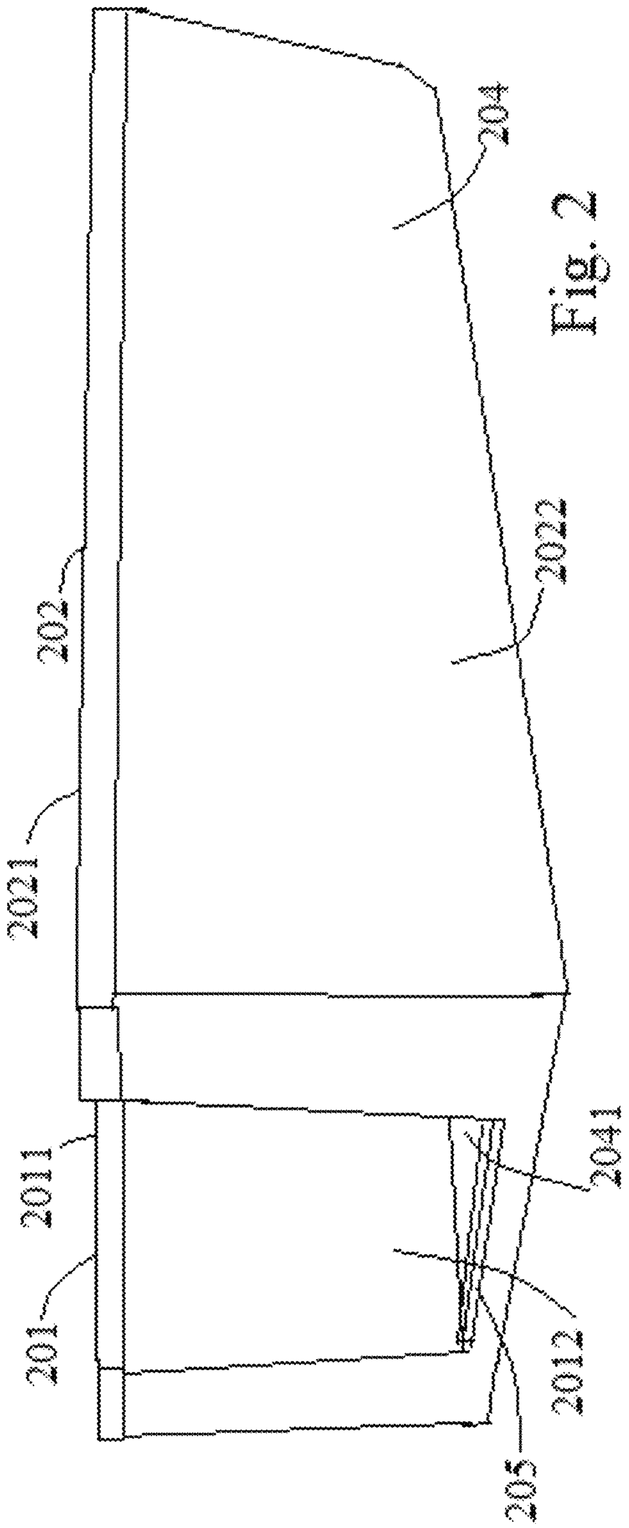
FIG. 2 shows a perspective view of the boat hull washing apparatus in FIG. 1.

Reference is made also to FIG. 2. The jetties form vertical walls of a submerged retention frame 204. Thereby, the retention frame may comprise three vertical walls, two of which 2012, 2022 are seen in FIG. 2. The vertical walls are at upper edges thereof fixed to a respective walkway 2011, 2021 of the left, right, and transverse jetties. The frame walls are connected to each other at right angles at the intersections of the jetties. A submerged, horizontal bottom wall 2041 connects the lower edges of the vertical walls.

The apparatus may comprise one or more floating bodies (not shown) to allow it to float. The floating bodies may be attached to the jetty assembly, e.g. to the retention frame 204. The floating bodies may be of any suitable kind, e.g. air-filled containers, or made in a plastic foam material.

A gate 205 is provided between ends of the left and right jetties 201, 202 which are opposite to the ends at which the transverse jetty 203 is located. In a closed position, the gate connects two of the vertical walls, and the bottom wall, of the submerged retention frame 204. Thereby, the submerged retention frame and the gate form a box for retaining debris released for boat hulls during use of the apparatus. The submerged retention frame 204 and the gate may substantially form a rectangular cuboid. The submerged retention frame and the gate forms a basin.

As suggested in FIG. 2, the gate may be opened by being lowered. Alternatively, the gate may be opened by being moved or rotated sideways. The gate may comprise gate sections with hinge connections. Thereby the gate may be folded when open.

As exemplified in FIG. 2, the apparatus comprises two brushes 301, 302. The brushes comprise elongated brush sections 3011, 3012, 3021, 3022 held by respective brush frames (not shown). The brush frames are connected to each other at longitudinal ends of the brush sections. Two of the brush frames are connected to a respective of the left and right jetties 201, 202. The brushes 301, 302 extend in right angles to the left and right jetties. As seen from above, the brushes extend towards each other.

The brushes 301, 302 are rotatable around their respective longitudinal axes. For this rotation the brushes may be driven by respective motors, such as hydraulic motors. Alternatively, electric or pneumatic motors may be arranged to rotate the brushes 301, 302.

Further, the brush frames, end thereby the brushes 301, 302, are movable along the left and right jetties 201, 202, so as to move along a boat that is moored in the apparatus. For this movement the brush frames may be driven by respective motors, such as hydraulic motors. Alternatively, electric or pneumatic motors may be arranged to move the brushes.

The brushes 301, 302 are arranged to extend substantially horizontally when not engaged in washing a boat hull. To follow the shape of a boat hull, the brush frames, and thereby the brushes, are arranged to be angled downwards.

The brush frames may assume non-zero angles to each other. Further, the brush sections 3011, 3012, 3021, 3022 have respective central tubes, which are connected to each other, at longitudinal ends thereof, by universal joints. Thereby, the brush sections may assume non-zero angles to each other, while the torque, rotating the brush sections, is transmitted from one brush section to another.

When a boat is held in the apparatus, as exemplified below, the boat hull cleaning is activated, e.g. with a handheld remote control unit. Thereby, the rotating brushes 301, 302 move along the boat all the way to the stern and back, removing marine fouling. Thereby, the brush sections 3011, 3012, 3021, 3022 automatically align with the hull.

Figure 3:
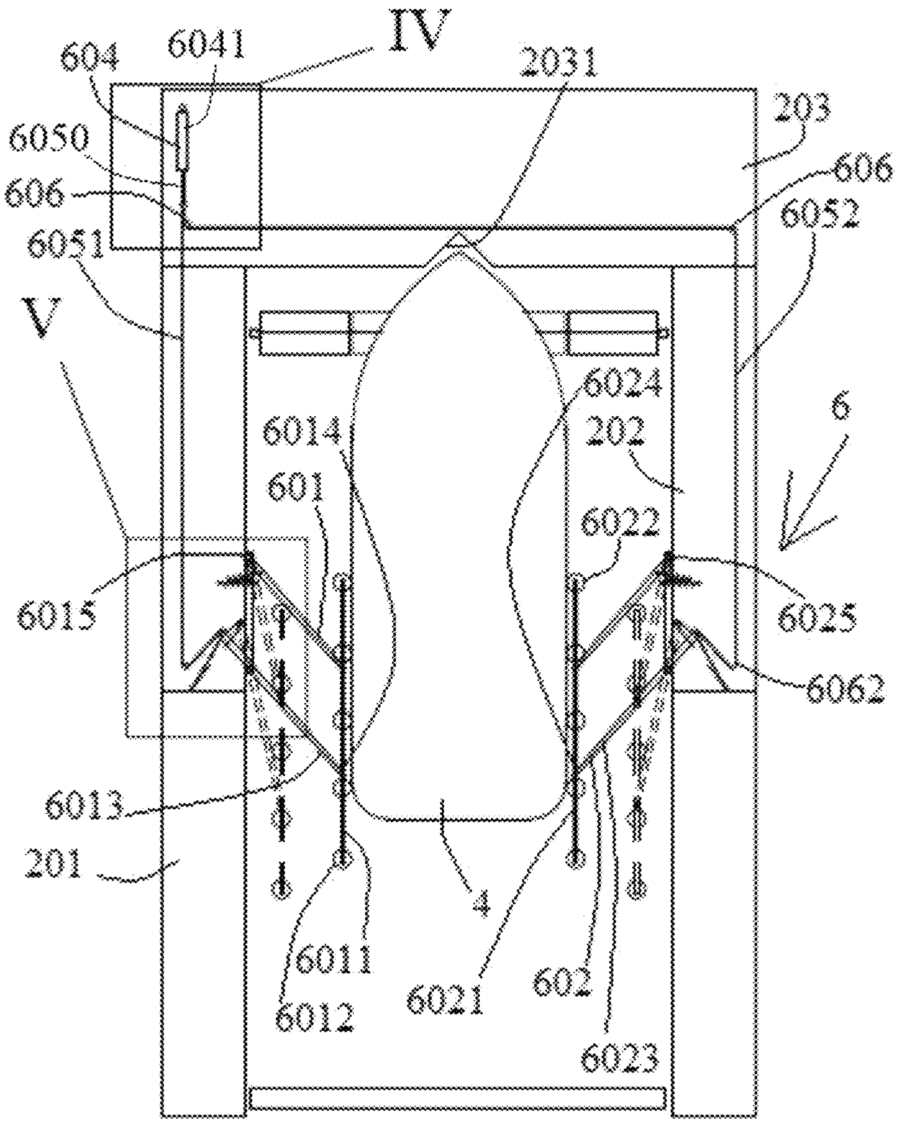
FIG. 3 shows the view of FIG. 1 with a boat in the apparatus.

Reference is made also to FIG. 3. For a boat 4 to enter the apparatus, the gate is opened. Thereafter, the boat may drive in between the left and right jetties 201, 202. The bow of the boat is fastened to the transverse jetty 203. For this, the transverse jetty may be provided with a recess 2031, to receive the bow of the boat. Thereafter the gate is closed.

The boat may be a pleasure boat, a power boat or a sailing boat. The left and right jetties may be no more than 40 meters long, e.g. no more than 30 meters long.

For holding the boat centered between the left and right jetties 201, 202, the apparatus is provided with a boat positioning assembly 6.

The boat positioning assembly 6 comprises left and right boat pushing devices 601, 602 for pushing the boat laterally. The left pushing device 601 is attached to the left jetty 201, and the right pushing device 602 is attached to the right jetty 202. Thereby, when the boat is between the left and right jetties 201, 202, the pushing devices 601, 602 are on opposite lateral sides of the boat. The pushing devices are arranged to push the boat in opposite directions. Thereby, the boat may be held in a lateral position by the pushing devices 601, 602 biasing the boat away from the respective left and right jetties 201, 202 to which the pushing devices are attached. Thereby, the lateral forces exerted by the pushing devices on the boat are equal. This may be accomplished as exemplified below.

Each pushing device 601, 602 comprises what is herein referred to as a pushing element. In this embodiment, the pushing element is provided in the form of a pushing bar 6011, 6021. The pushing bar is arranged to be substantially parallel to the left and right jetties 201, 202. The pushing bar 6011, 6021 is arranged to be in contact with a side of a boat. For this, the pushing bar may comprise a plurality of rollers 6012, 6022 distributed in a longitudinal direction of the pushing bar.

Each pushing bar 6011, 6021 may be moved in a partly lateral direction. For this, each pushing bar is connected to the respective of the left and right jetties 201, 202, via two connecting beams 6013, 6023. The beams are connected to the pushing bar 6011, 6021 by means of respective articulated joints 6014, 6024. Further, the beams 6013, 6023 are connected to the respective of the left and right jetties 201, 202 by means of further respective articulated joints 6015, 6025.

Thus, for each pushing device 601, 602, the pushing bar 6011, 6021, the connecting beams 6013, 6023, and the respective of the left and right jetties 201, 202, form a parallelogram with an adjustable angle between the pushing bar, and the connecting beams. Thereby, by rotating the connecting beams 6013, 6023, the pushing bar is moved, while remaining parallel to the left and right jetties 201, 202, along a circular path, which is partly lateral in relation to the left and right jetties. This is exemplified in FIG. 3.

The arrangement with a circular movement of the respective pushing bar 6011, 6021, provides for the pushing device 601, 602 to occupy a relatively small space on, or in, the respective jetty. This is advantageous compared to an arrangement with a linear displacement of a device for pushing the boat, since such a displacement will require a space which is relatively large in the lateral direction of the jetty.

It is noted that the movement of the pushing bar 6011, 6021 towards the boat, is combined with a movement towards the transverse jetty 203. Thereby, for boats which are relatively small, i.e. which are relatively short, and have a relatively narrow beam, the pushing bars are, when biasing the boat, positioned closer to the transverse jetty 203, compared to when biasing a relatively large boat. Thereby, an automatic adjustment of the boat positioning assembly 6 to the size of the boat is accomplished.

Figure 4:
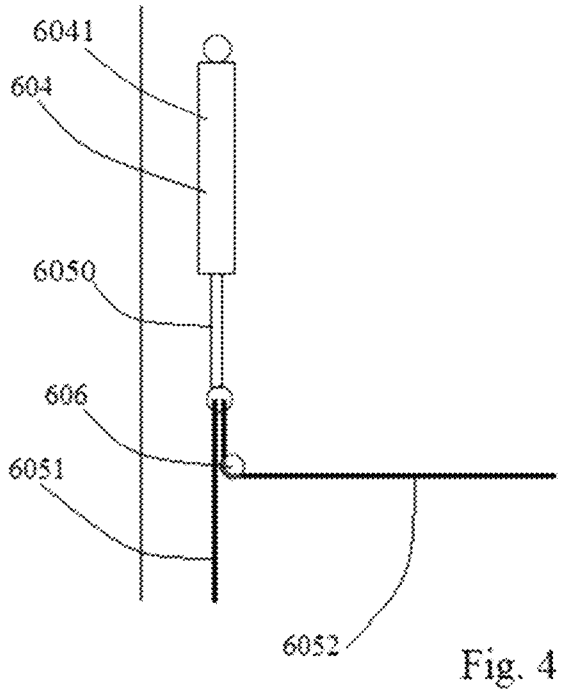
FIG. 4 shows a detail of FIG. 3, as indicated by the rectangle IV in FIG. 3.

Reference is made also to FIG. 4. The boat positioning assembly 6 comprises a force generating unit 604, which in turn may comprise one or more actuation devices 6041. The one or more actuation devices 6041 may be controlled manually, e.g. via a remote control device. The or each actuation device 6041 comprises a movable part. In this embodiment, for rotating the connecting beams 6013, 6023, and to bias the boat in opposite lateral directions, such an actuation device 6041, is attached to the jetty assembly, and connected to the pushing devices 601, 602.

As exemplified in FIG. 3, the force generating unit 604 is attached to the jetty assembly at an intersection between the transverse jetty 203 and one of the left and right jetties 201, 202. The boat positioning assembly further comprises two actuation connection devices in the form of elongated flexible pulling elements 6051, 6052. The pulling elements may be ropes, wires, or chains. As can be seen in FIG. 4, the boat positioning assembly further comprises a single movable connection element 6050 connecting the actuation device 6041 to the two actuation connection devices 6051, 6052. Thus, the actuation device 6041 is connected to at least one of the connecting beams 6013, 6023 of the respective pushing device 601, 602, via a respective of the elongated flexible pulling elements 6051, 6052, and the single movable connection element 6050. The pulling elements extend from the single movable connection element 6050 to the pushing devices via blocks 606.

As can be seen in FIG. 4, the single movable connection element 6050 is in this embodiment formed by a rod of a hydraulic actuator. The actuation device 6041 is formed by the remainder of the hydraulic actuator. The movable part of the actuation device 6041 may then be formed by a piston in the hydraulic actuator. Alternatively, the single movable connection element 6050 may be provided in the form of a rope, a wire, a chain, a rod, a bracket, or any other suitable single device. The force generating unit may then comprise a complete actuator. Where the force generating unit 604 comprises two or more parallel actuation devices 6041, the single movable connection element 6050 may be provided as a bracket connecting all actuation devices 6041 to the actuation connection devices 6051, 6052.

As suggested, where the is only one actuator, the single movable connection element 6050 may be formed by a part, e.g. a rod, of the actuator, and the force generating unit 604 may be formed by the remainder of the actuator. In some embodiments, the force generating unit 604 is formed by at least a portion of one or more electric or pneumatic actuators. The one or more actuation devices of the force generating unit 604 may be one or more linear actuators, or one or more parts thereof.

Figure 5:
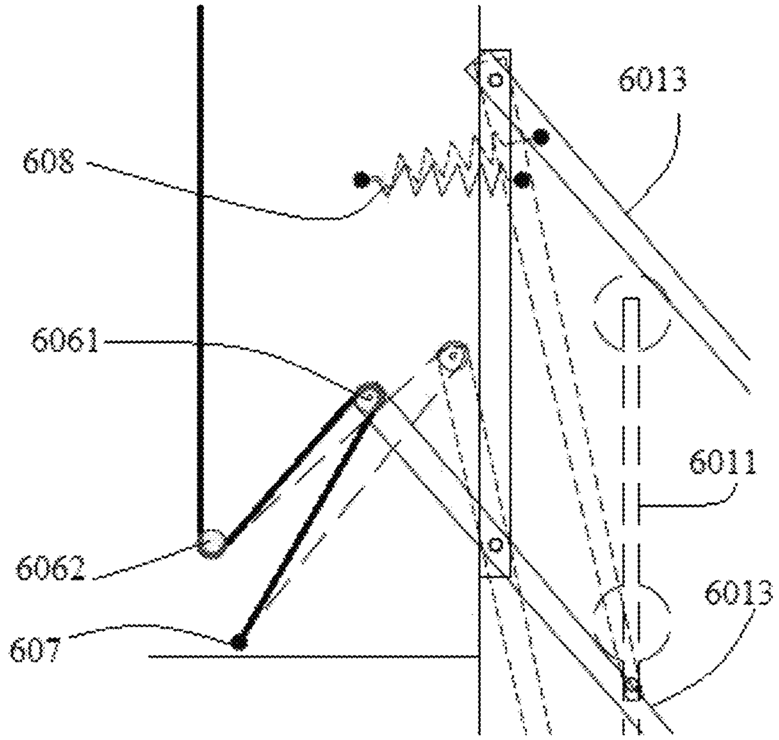
FIG. 5 shows a detail of FIG. 3, as indicated by the rectangle V in FIG. 3.

Reference is made also to FIG. 5. The actuation connection devices 6051, 6052 engages the respective connecting beams 6013, 6023, on a side of the articulated joint connecting the beam to the respective jetty, which is opposite to the side on which the beam is connected to the respective pushing bar 6011, 6021. In this example, each actuation connection device 6051, 6052 is fixed to the respective jetty at a fixation position 607, and extends from the fixation position to a block 6061 on the respective connecting beam, from this block 6061 to a further block 6062 fixed to the respective jetty, and from the further block towards the actuation device 6041.

Thereby, the force in the actuation connection device 6051, 6052 may be reduced compared to a case where the actuation connection device 6051, 6052 is fixed to the respective beam. It should be noted that said block 6062 fixed to the respective jetty is positioned so that relatively a high force in the actuation connection device is avoided when the angle between the connecting beam and the jetty is relatively high.

By an action of the actuation device 6041 the pushing devices 601, 602 are moved simultaneously on either side of the boat.

By the actuation of the pushing devices 601, 602 by means of a single actuation device 6041, via the actuation connection devices 6051, 6052, an advantageous use of the actuation device is provided. If a boat, having entered the boat hull washing apparatus, is closer to one of the left and right jetties 201, 202, than to the other one, the boat will be pushed by only one of the pushing devices 601, 602, with the full power of the actuation device 6041. Subsequently, when the other pushing device has reached contact with the boat, each pushing device will bias the boat with half the energy with which the actuation device pulls the pulling devices. Thereby, the boat may be in what is herein referred to as a holding position. In the holding position, the boat may be correctly positioned in relation to the brushes.

Preferably, the one or more the actuation devices 6041 are controlled to provide a maximum force for pushing a boat by only one of the pushing devices 601, 602. Where the one or more the actuation devices 6041 are hydraulic cylinders, such a maximum force may be controlled by one or more pressure regulating valves, e.g. one or more relief valves. The one or more pressure regulating valves may be adjustable.

Further, the one or more the actuation devices 6041 may be controlled to provide maximum forces for the pushing devices to hold the boat in the holding position. Where the one or more the actuation devices 6041 are hydraulic cylinders, such maximum forces may be controlled by one or more pressure regulating valves, e.g. one or more relief valves. The one or more pressure regulating valves may be adjustable. Thereby, said maximum forces may be adjusted to adapt the boat washing apparatus to external conditions, such as winds or currents, tending to move the boat out of the holding position.

The one or more pressure regulating valves which control the maximum forces for the pushing devices to hold the boat in the holding position, may be separate from one or more pressure regulating valves which control a maximum force for pushing a boat by only one of the pushing devices 601, 602.

Embodiments of the invention provides a simple and robust solution for positioning a boat in a boat washing apparatus. In particular, the invention can be embodied without the need for electronics. This is particularly advantageous in environments in which the apparatus is used, e.g. in salt water.

Although the actuation device 6041, the actuation connection devices 6051, 6052, and the blocks, are, for ease of the presentation here, shown in the figures as being located on top of upper surfaces of the jetties, these parts of the boat positioning assembly 6 are advantageously provided inside the jetties, below the upper surfaces of the jetties. It should be noted that the actuation device 6041 may be attached to the jetty assembly at any alternative suitable location, e.g. centrally in or on the transverse jetty 203.

The boat positioning assembly comprises two elastic elements. As understood from FIG. 5, each elastic element 608 is arranged to bias the respective pushing device 601, 602 into a retracted position. In FIG. 3 and FIG. 5, the retracted position is indicated with broken lines. In the retracted position, the pushing bar 6011, 6021 is located closer to the respective jetty, than when being in contact with a boat. This facilitates the use of the elongated flexible actuation connection devices 6051, 6052 for the actuation of the actuation device 604. For example, the actuation connection devices 6051, 6052 may be designed to transfer only tension, i.e. no compression. By means of the elastic elements 608, no push rods will be needed for moving the pushing devices 601, 602 to the retracted position. Also, where the actuation device is a hydraulic cylinder, the cylinder may be a single acting cylinder.

In alterative embodiments, each pushing device 601, 602 comprises a single beam connected to a respective of the left and right jetties 201, 202 with a respective articulated joint. Thereby, a pushing element in the form of a roller may be provided at a distal end of the beam, for contacting a boat hull. A mechanism, e.g. similar to the one described above, may be provided to rotate the beams 6013, 6023, so as to push the boat from opposite lateral directions, so as to bias the boat in a fixed lateral position.

It is to be understood that the present invention is not limited to the embodiments described above and illustrated in the drawings; rather, the skilled person will recognize that many changes and modifications may be made within the scope of the appended claims.

I claim:

1. A boat hull washing apparatus comprising a left structure and a right structure, the apparatus further comprising one or more brushes arranged to wash a hull of a boat positioned between the structures, wherein the apparatus is provided with a boat positioning assembly comprising a left boat pushing device and a right boat pushing device, wherein the left boat pushing device is attached to the left structure, and the right boat pushing device is attached to the right structure, whereby the left boat pushing device is arranged to bias a boat, located between the left and right structures, away from the left structure, and the right boat pushing device is arranged to bias the boat away from the right structure, whereby the pushing devices are arranged to hold the boat in a lateral position, wherein, for said arrangement of the left and right pushing devices to bias the boat away from the left and right structures, respectively, a single force generating unit is connected to both pushing devices, wherein the single force generating unit is connected to both pushing devices via respective actuation connection devices, wherein the actuation connection devices comprise elongated flexible pulling elements.

2. An apparatus according to claim 1, wherein the single force generating unit is connected to both pushing devices via a single movable connection element.

3. An apparatus according to claim 1, wherein the left and right structures form parts of a structure assembly, wherein the single force generating unit is attached to the structure assembly.

4. An apparatus according to claim 1, wherein each pushing device comprises a pushing element, wherein each pushing element is connected to a respective of the left and right structures via one or more connecting beams, wherein the single force generating unit is arranged to rotate the connecting beams, so as for the pushing elements to contact a boat located between the left and right structures to bias the boat in opposite lateral directions.

5. An apparatus according to claim 4, wherein the left and right structures form parts of a structure assembly, wherein the single force generating unit is attached to the structure assembly and connected to at least one of the connecting beams of the respective pushing device, via a respective one of the actuation connection devices.

6. An apparatus according to claim 1, wherein an elastic element is arranged to bias the respective pushing device into a retracted position.

* * * * *